United States Patent
Touzet et al.

(10) Patent No.: US 12,308,711 B2
(45) Date of Patent: May 20, 2025

(54) AUTOMATIC MACHINE FOR THE ORDERED WINDING OF WIRE WITH GRADUATION FOR MULTI-POLE ROTOR

(71) Applicant: THALES, Courbevoie (FR)

(72) Inventors: Eric Touzet, Chatou (FR); Nicolas Potelle, Chatou (FR); Xavier Lefeuvre, Chatou (FR); Rémi Louviot, Chatou (FR); Sébastien Strim, Chatou (FR); Céline Gauthier, Chatou (FR)

(73) Assignee: THALES, Courbevoie (FR)

( * ) Notice: Subject to any disclaimer, the term of this patent is extended or adjusted under 35 U.S.C. 154(b) by 476 days.

(21) Appl. No.: 17/875,646

(22) Filed: Jul. 28, 2022

(65) Prior Publication Data

US 2023/0036468 A1 Feb. 2, 2023

(30) Foreign Application Priority Data

Jul. 28, 2021 (FR) ...................................... 2108201

(51) Int. Cl.
*H02K 15/00* (2025.01)
*H02K 3/18* (2006.01)
*H02K 15/095* (2006.01)

(52) U.S. Cl.
CPC ............. *H02K 15/095* (2013.01); *H02K 3/18* (2013.01)

(58) Field of Classification Search
CPC ........ H02K 15/095; H02K 3/18; B65H 81/08; H01F 41/09; H01F 41/094
See application file for complete search history.

(56) References Cited

U.S. PATENT DOCUMENTS 5,233,751 A * 8/1993 Luciani ................ H02K 15/095
242/432.4

FOREIGN PATENT DOCUMENTS

| DE | 2947976 C2 * | 1/1989 | ........... H02K 15/095 |
| DE | 102018214701 A1 * | 3/2020 | |
| EP | 1158649 A2 * | 11/2001 | ........... H02K 15/095 |
| EP | 1376829 A2 * | 1/2004 | ........... H02K 15/095 |
| EP | 3506469 A1 * | 7/2019 | ......... H02K 15/0031 |
| JP | H10112962 A | 4/1998 | |
| WO | WO-2007104484 A1 * | 9/2007 | ............ H02K 15/08 |
| WO | WO-2017006727 A1 * | 1/2017 | ............ H01F 41/04 |

* cited by examiner

*Primary Examiner* — Emmanuel M Marcelo
(74) *Attorney, Agent, or Firm* — BakerHostetler

(57) ABSTRACT

An automatic winding device for winding wire onto a pole of a multi-pole rotor, the pole includes a bottom and a head, the device comprising: a support vice supporting the rotor and capable of rotational movement about a first axis, a needle plate, centred on the pole along the first axis and comprising four placement needles, which is capable of translational and rotational movement about the first axis, a conducting wire, attached to the rotor and to a wire winder, in contact with at least one placement needle, the winding device being able to perform a number of sequences from an "initial configuration" to a "winding configuration" wherein, successively, the needle plate is rotated and the pole is moved translationally with respect to the needle plate along the first axis so as to wind the conducting wire around the pole as far as a "final configuration".

13 Claims, 4 Drawing Sheets

AUTOMATIC MACHINE FOR THE ORDERED WINDING OF WIRE WITH GRADUATION FOR MULTI-POLE ROTOR

CROSS-REFERENCE TO RELATED APPLICATION

This application claims priority to foreign French patent application No. FR 2108201, filed on Jul. 28, 2021, the disclosure of which is incorporated by reference in its entirety.

FIELD OF THE INVENTION

The invention relates to the field of the winding of rotors and more particularly the winding of multi-pole rotors comprising more than four poles. More specifically, the invention relates to an automatic winding method and device for the winding of multi-pole rotors. Nevertheless, the invention finds an application in the field of automated winding in a confined space or in an environment in which the spacing between the coils does not allow access by an articulated arm intended for winding.

BACKGROUND

Traditionally, winding with a high fill factor, or the action of winding any electrical wire onto an insulating coil of a magnetic steel mass of a multi-pole rotor, which is to say a rotor comprising more than four magnetic poles, is done by hand. This is because this action requires know-how and special and constant attention on the part of the person doing the winding. The poles may comprise more than one layer of turns, or full circumnavigation of the electrical wire around the pole. Thus, the action of winding can be repeated several times on the one same magnetic pole in order to stack up a defined number of layers of turns, thus making it possible to increase the magnetic flux in the rotor and the magnetomotive force thereof.

In order to wind rotors having four or fewer than four magnetic poles, there are automated machines that are able to take on the task of the automatic winding of the poles. Nevertheless, these machines are not suitable for rotors comprising a number of poles higher than four magnetic poles.

This is because, in situations where a rotor comprising four magnetic poles or fewer than four magnetic poles is to be wound, the space between the adjacent poles is sufficiently large to allow any winding machine or an articulated arm controlled by a winding machine to gain access. Conversely, in the case of rotors comprising more than four magnetic poles, the adjacent poles mask the winding zone to a greater extent. The free space between the adjacent poles decreases significantly and therefore no longer allows the use of a winding machine for a four-pole rotor. This observation is particularly pronounced in the case of a rotor comprising six or more magnetic poles, where the winding zone is very restricted or even very tight at the bottom of the poles of the rotor.

At the present time, the winding of these rotors comprising more than four poles is performed using semiautomatic machines that require human intervention during the winding phases. Specifically, during winding, each turn formed has to be checked by a winding operative.

In the event of imprecision in the placement and tension of a turn during the winding in a full layer of turns, the error has an impact on the entirety of the layers of turns stacked up around the pole leading to magnetic problems with the pole. Conversely, checking and correcting imprecisions in the placement or tension of the turns around the pole require skilled operators. At the present time, winding a stack of layers of turns on a pole of a rotor comprising more than four poles is a painstaking and time-consuming task.

What is more, human attention is not always infallible. The case may therefore often arise, with the repetitive action of checking the correct conformity of a layer of turns on a pole, that certain errors or imprecisions remain undetected. As a result, the filling of the wires around the pole is not optimal, reducing the magnetomotive force of the multi-pole rotor.

There are thus, at the present time, two technical limitations associated with the winding of the poles of rotors having more than four magnetic poles, and these are:

the limited space due to the tight spacing between the poles that are to be wound. Specifically, this winding zone then appears to be masked by the adjacent poles when viewed from the outside and therefore does not allow the use of a machine or of an articulated arm which are both too bulky for the space available in this masked winding zone, it is impossible to obtain a graduated winding, which is to say obtain a stack of layers of turns around the pole that is suited to the dimension of the pole and notably to the reduction in space in the bottom of the pole as a result of the imprecisions and non-optimization of the winding. Typically, a graduated winding makes it possible to obtain the number of turns suited to each layer according to the space available while at the same time ensuring that there is enough space for the winding of the adjacent poles.

SUMMARY OF THE INVENTION

The invention seeks to alleviate all or some of the abovementioned problems by proposing an innovative device for the automatic ordered winding of wire onto a pole of a rotor comprising more than four poles. The device makes it possible to wind a pole in confined spaces and in a more technical manner. The device also allows a pole to be wound automatically in order to obtain a graduated stack of layers of turns allowing optimal filling of the pole. The device according to the invention makes it possible to dispense with any human intervention during the winding while at the same time reducing the time taken to wind the poles and ensuring optimal ordering of the wire wound around the pole.

To this end, one subject matter of the invention is an automatic winding device for winding wire onto a pole of a multi-pole rotor, the pole comprising a bottom and a head, the automatic winding device being characterized in that it comprises:

a support vice supporting the multi-pole rotor and capable of rotational movement about a first axis passing through the pole of the multi-pole rotor, a needle plate, aligned with the pole of the multi-pole rotor along the first axis, the needle plate comprising four placement needles, the needle plate being capable of translational and rotational movement about the first axis, a conducting wire attached to the multi-pole rotor at a first end of the conducting wire and to a wire winder at a second end of the conducting wire, the conducting wire being in contact with at least one placement needle, the automatic winding device being able to perform a predetermined number of sequences from an "initial configuration" in which each placement needle applies a predetermined pressure to the pole at a predetermined angle with respect to the first axis to a "winding configuration" in which a rotation of the needle plate equivalent to a full rotation of the pole about the first axis and a translational movement of the pole with respect to the needle plate by a length equal to the diameter of the conducting wire along the first axis occur in succession so as to wind the conducting wire around the pole, as far as a "final configuration" in which each placement needle is distant from the pole along a second axis that is radial to the needle plate.

According to one aspect of the invention, each placement needle is proximate to the pole at a distance less than or equal to 0.3 millimetres during the "initial configuration".

According to one aspect of the invention, each placement needle is against the pole in the "initial configuration".

According to one aspect of the invention, each placement needle comprises an end of a shape that complements the pole of the multi-pole rotor.

According to one aspect of the invention, the winding device comprises a wire feed arm, the feed arm being capable of translational movement along the first axis.

According to one aspect of the invention, the automatic winding device is able to move to a "hybrid configuration" after the "winding configuration", wherein, in succession, the support vice performs a rotation equivalent to a full rotation of the pole about the first axis and the wire feed arm performs a translational movement along the first axis, each placement needle being distant from the pole of the multi-pole rotor along the second axis.

According to one aspect of the invention, each placement needle is connected to an indicator for detecting an insulation fault with the conducting wire.

According to one aspect of the invention, the winding device comprises a wire tension sensor, the tension sensor being in contact with the conducting wire.

According to one aspect of the invention, the winding device comprises a companion able to attach the conducting wire to the multi-pole rotor and to detach the conducting wire from the multi-pole rotor.

According to one aspect of the invention, the support vice supporting the multi-pole rotor is a self-centring clamping vice.

The invention also relates to an automatic winding method for winding wire onto a pole of a multi-pole rotor, comprising the following steps:
  executing the "initial configuration", defined as being the placing of the four placement needles in such a way as to apply pressure to the pole of the multi-pole rotor,
  attaching the conducting wire to the multi-pole rotor by a first end of the conducting wire using a companion,
  executing the "winding configuration", defined as being the succession of the rotation of the support vice supporting the multi-pole rotor and of the needle plate about the first axis equivalent to the full rotation of the pole of the multi-pole rotor, the translational movement of the pole with respect to the needle plate by a length equal to the diameter of the conducting wire along the first axis, it being possible for the "winding configuration" to be iterated in a predetermined manner,
  executing the "final configuration", defined as being the distancing of the four placement needles from the pole of the multi-pole rotor along the second axis,
  the steps of executing the "initial configuration", of executing the "winding configuration" and of executing the "final configuration" being able to be executed a predetermined number of times.

According to one aspect of the invention, the method comprises a step of executing the "hybrid configuration", defined as being the distancing of the four placement needles from the pole of the multi-pole rotor along the second axis, the rotating of the support vice supporting the multi-pole rotor about the first axis equivalent to a full rotation of the pole of the multi-pole rotor, and the translational movement of the wire feed arm along the first axis, it being possible for the rotating of the support vice supporting the multi-pole rotor and the translational movement of the wire feed arm to be iterated in a predetermined way, following on from the step of executing the "winding configuration".

According to one aspect of the invention, the method comprises a detaching step whereby the companion detaches the conducting wire from the multi-pole rotor, following on from the step of executing the "final configuration".

BRIEF DESCRIPTION OF THE DRAWINGS

The invention will be better understood and other advantages will become apparent from reading the detailed description of one embodiment given by way of example, the description being illustrated by the attached drawing in which.

For the sake of clarity, in the various figures the same elements will bear the same references.

DETAILED DESCRIPTION

Figure 1:
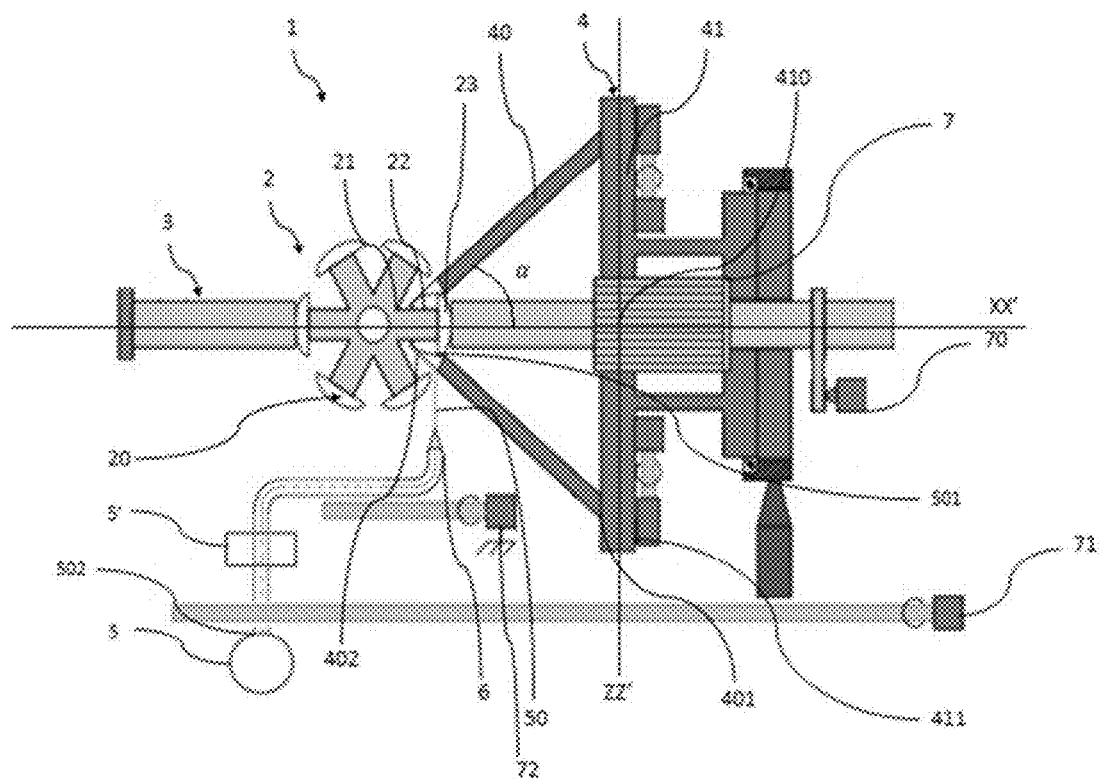
FIG. 1 depicts a schematic view of an automatic winding device for winding wire onto a pole of a multi-pole rotor according to the invention.

FIG. 1 depicts a schematic view of a view in cross section of an automatic winding device 1 for winding wire onto a pole 20 of a multi-pole rotor 2 according to the invention. The multi-pole rotor 2 comprises at least four poles 20, and preferably at least six poles 20. Each pole 20 has a bottom 21 near the axis of rotation of the multi-pole rotor 2, a body 22 that is to be wound and a head 23 completely covering the body 22 along a first axis XX' passing through the head 23, the body 22 and the bottom 21 of the one same pole 20, and placed at the periphery of the multi-pole rotor 2.

The automatic winding device 1 for winding wire onto the pole 20 of a multi-pole rotor 2 comprises:
  a support vice 3 supporting the multi-pole rotor 2 and capable of rotational movement about the first axis XX' passing through the pole 20. More specifically, the pole 20 can be likened to an empty bobbin. Further, the first axis XX' is the axis passing through the centre of a cross section of this coil bobbin perpendicular to the head 23 of the pole 20. The support vice 3, which is depicted more specifically in FIG. 2, holds the multi-pole rotor 2 in place. Specifically, the support carriage 3 ensures only rotational mobility of the multi-pole rotor 2 about the first axis XX'. Thus, the support vice 3 prevents any translational movement of the multi-pole rotor 2 and any other rotation that is not centred about the first axis XX'.

a needle plate 4, centred on the pole 20 of the multi-pole rotor 2 about the first axis XX' and capable of rotational movement about the first axis XX'. The needle plate 4 takes the form of a circular bearing structure 41 which has a centre 410 through which there pass axially a spline 7, capable of translational movement along the first axis XX', and the first axis XX'. The needle plate 4 comprises four placement needles 40, each placement needle 40 being positioned, at a first end 401, against the bearing structure 41 and equidistant from the centre 410. As a preference, the first end 401 of the placement needles 40 is positioned proximate to a periphery 411 of the circular bearing structure 41, which is to say that the first end 401 of each placement needle 40 is closer to the periphery 411 of the needle plate 4 than to the centre 410. The placement needles 40 are in contact with the pole 20 of the multi-pole rotor 2 via a second end 402. More specifically, the second end 402 is in contact with the body 22 of the pole 20. As an alternative, the placement needles 40 are close to the pole 20 of the multi-pole rotor 2 by a distance less than or equal to 0.3 millimetres between the second end 402 and the body 22. The head 23, which completely covers the body 22, therefore forms an obstacle between the second end 402 of each placement needle 40 and the body 23. Thus, the placing of the first end 401 proximate to the periphery 411 of the bearing structure 41 makes it possible to obtain a maximum angle 90°—α between each placement needle 40 and the bearing structure 41 and allows each needle to pass around the head 23 of the pole and come into contact with the body 22 that is to be wound.

a conductor wire 50 attached to the multi-pole rotor 2 at a first end of the conducting wire 501 and to a wire winder 5 at a second end of the conducting wire 502. The conducting wire 50 is in contact with at least one placement needle 40. As a preference, the conducting wire 50 is copper wire.

The placement needles 40 are positioned against the pole 20 of the multi-pole rotor 2 so as to allow the conducting wire 50 to be partially wound around the placement needles 40. In a preferred configuration, the placement needles 40 are positioned uniformly against the body 22, which is to say equidistant from one another.

In a variant, the placement needles 40 are distributed in such a way as to be proximate to one another pairwise.

Figure 4:
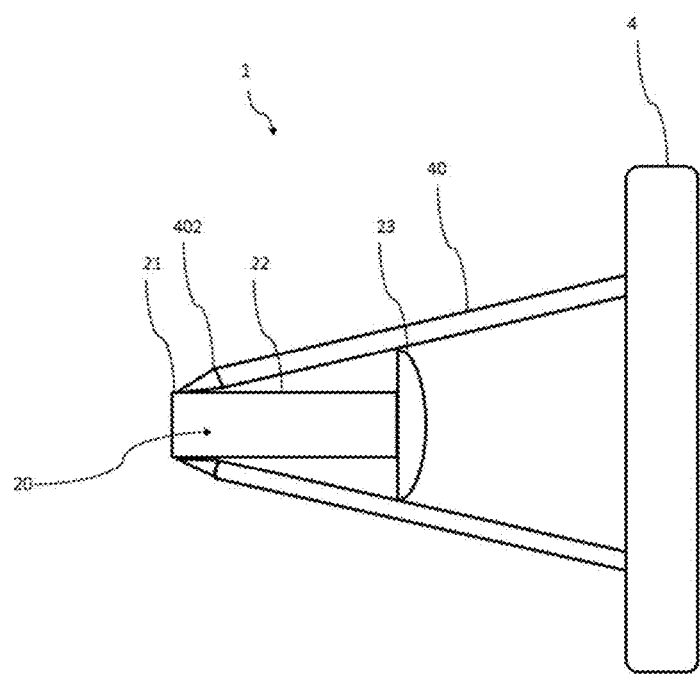
FIG. 4 depicts a schematic view of the needle plate and of the pole of the multi-pole rotor in an "initial configuration"
Figure 5:
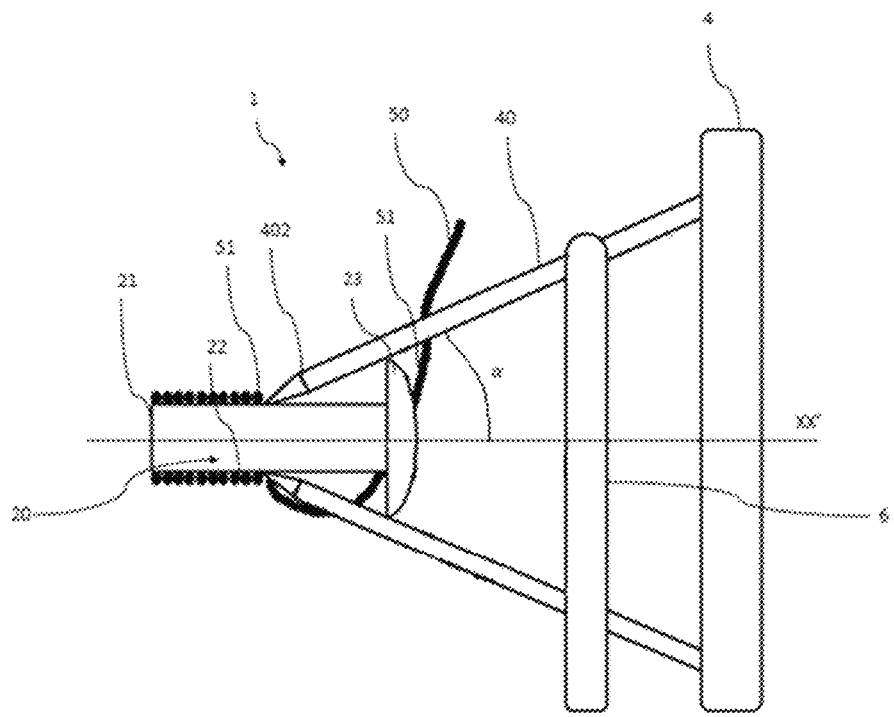
FIG. 5 depicts a schematic view of the needle plate and of the pole of the multi-pole rotor in a "winding configuration"
Figure 6:
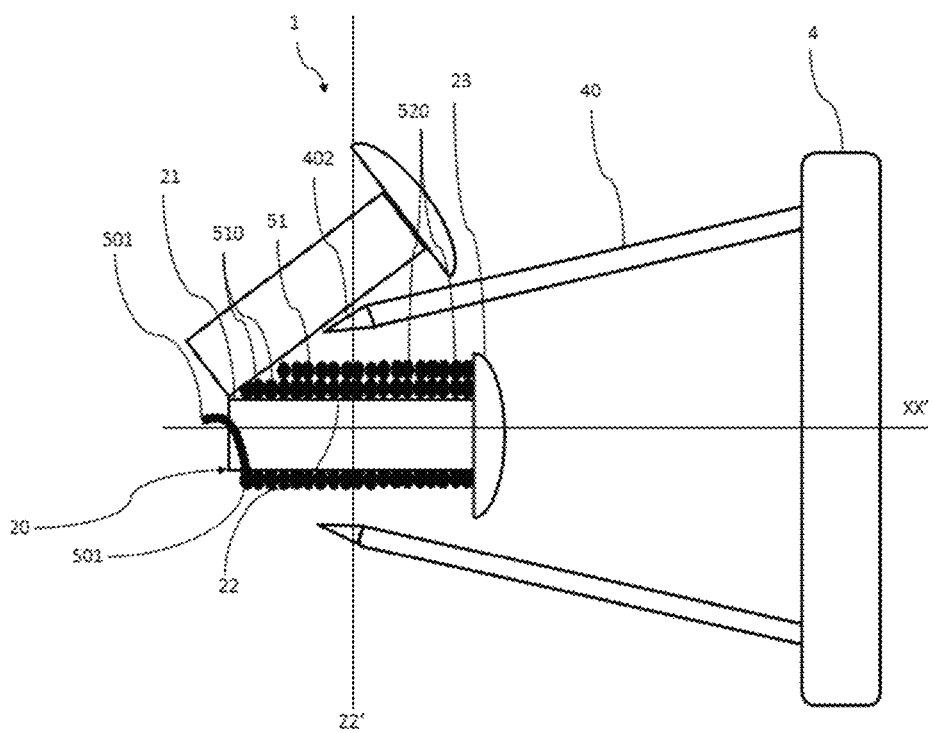
FIG. 6 depicts a schematic view of the needle plate and of the pole of the multi-pole rotor in a "final configuration"

The automatic winding device 1 is able to perform a predetermined number of sequences from an "initial configuration" depicted in FIG. 4, in which each placement needle 40 applies a predetermined pressure to the pole 20 at the angle α with respect to the first axis XX', to a "winding configuration" depicted in FIG. 5, in which a rotation of the needle plate 4 equivalent to a full rotation of the pole 20 about the first axis XX' and a translational movement of the pole 20 with respect to the needle plate 4 by a length equal to the diameter of the conducting wire 50 along the first axis XX' occur in succession so as to wind the conducting wire 50 around the pole 20, as far as a "final configuration" depicted in FIG. 6, in which each placement needle 40 is distant from the pole 20 along a second axis ZZ' extending radially with respect to the needle plate 4. In a variant, in the "initial configuration", each placement needle 40 applies a predetermined pressure to the pole 20 then moves away from the pole 20 by a distance less than or equal to 0.3 millimetres between the second end 402 and the body 22 so as to provide a clearance.

Depending on the positioning of the second end 402 of each placement needle 40 with respect to the body 22 of the pole 20, the angle α varies from 25° to 65° with respect to the first axis XX' and is preferably 45°.

The automatic winding device 1 comprises a wire feed arm 6 capable of translational movement along the first axis XX'. This feed arm 6 allows conducting wire 50 to be placed against a placement needle 40.

Thus, in the "winding configuration", the automatic winding device 1 performs, in succession:

an identical rotation of the support carriage 3, connected directly to the needle plate 4, via the spline 7, and of the needle plate 4 and which is equivalent to a full rotation of the pole 20 about the first axis XX'. More specifically, the automatic winding device 1 comprises a motor 70 for rotating the needle plate 4 which, by means of the placement needles 40 which compress the pole 20, imposes an identical rotation on the support vice 3 and on the multi-pole rotor 2. Thus, the conducting wire 50, which is attached to the multi-pole rotor 2 at the first end of the conducting wire 501, mimics the rotational movement of the needle plate 4 and winds around the placement needles 40 forming a turn 51, as depicted in FIG. 5.

a translational movement of the pole 20 of the multi-pole rotor 2 with respect to the needle plate 4 by a length equivalent to the diameter of the conducting wire 50 along the first axis XX'. This translational movement of the pole 20 with respect to the needle plate 4 is along the first axis XX' and in the direction of winding, which is to say that if the winding is being done from the bottom 21 towards the head 23 of the pole 20, then the translational movement adopts this direction. Conversely, if the winding is being done from the head 23 towards the bottom 21 of the pole 20, along the body 22 that is to be wound, which is to say in the opposite direction to the direction mentioned, then the translational movement adopts this opposite direction. In addition, each turn 51 formed around the four placement needles 40 by the winding of the conducting wire 50 around the needle plate 4 naturally, because of the presence of the angle α, slides along the placement needles 40 towards the second end 402 of the placement needles 40 and the body 22 that is to be wound of the pole 20. In order to allow this translational movement between the pole 20 and the needle plate 4, the automatic winding device 1 comprises a first translational-drive motor 71 driving the spline 7 along the first axis XX'. Furthermore, in order to allow the feed arm 6 to place the conducting wire 50 perfectly against a placement needle 40, the automatic winding device 1 may comprise a second translational-drive motor 72 driving the wire feed arm 6 to allow the feed arm 6 to be mobile and to have the same translational mobility along the first axis XX' as the needle plate 4.

Figure 2:
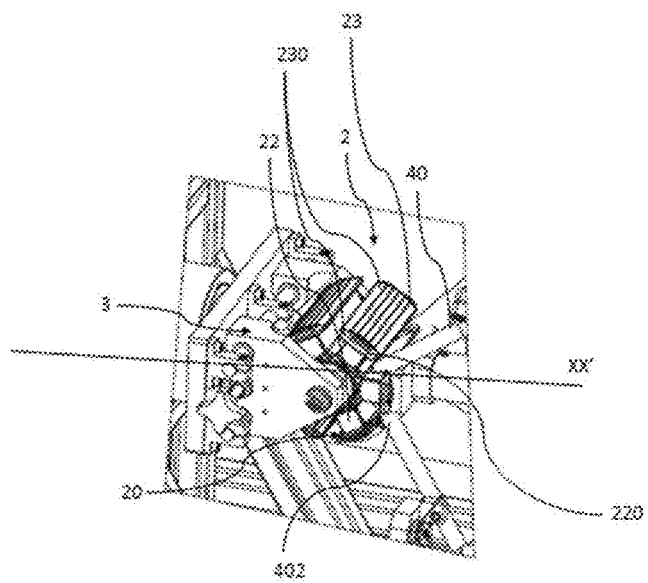
FIG. 2 depicts an enlarged view of a multi-pole rotor within the automatic wire winding device according to the invention.

FIG. 2 depicts an enlarged view of the multi-pole rotor 2, centred about the pole 20 that is to be wound which faces the needle plate 4 and the placement needles 40. The support vice 3 holds the multi-pole rotor 2 in place with respect to the axis of rotation of the multi-pole rotor 2 so as to impede any natural rotation of the multi-pole rotor 2 about its axis of rotation. By way of example, the rotor support vice 3 may be a self-centring clamping vice but more generally speaking may be a mechanical device able to limit the mobility of the multi-pole rotor 2 to a rotation about the first axis XX'.

Each body 22 of the pole 20 takes the form of a parallelepiped completely covered along an external edge 220 by the head 23 which also takes the form of a small-thickness parallelepiped. In a variant, the body 22 of the pole 20 takes the form of a cylinder and the head 23 takes the form of a flattened hemisphere.

Figure 3:
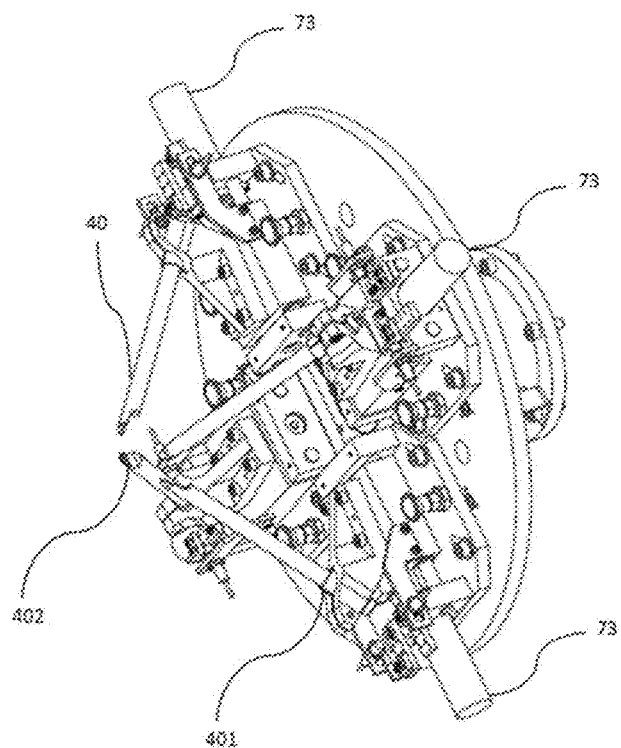
FIG. 3 depicts an enlarged view of a needle plate of the automatic wire winding device according to the invention.

Each placement needle 40 comprises an end of a shape that complements the pole 20 of the multi-pole rotor 2. As depicted in FIG. 3, the second end 402 of each placement needle 40 has a shape that complements that of the body 22 of the pole. Each placement needle 40 has the form of a cylinder. That being the case, contact between the second end 402 of each placement needle and the body 22 of the pole 20 is not optimal. Specifically, one function of the placement needles 40 is to accompany the positioning of the turns 51 plumb with the body 22 of the pole 20 and to guarantee the immobility of these turns 51 once positioned. Thus, in order to optimize the positioning between each placement needle 40 and the body 22 of the pole 20, the second end 402 is of a shape that complements the body 22 of the pole 20. Advantageously this complementing shape allows the second end 402 to get closer to the head 23.

The needle plate 4 also comprises as many actuating motors 73 as there are placement needles 40. Thus, in a preferred case, the needle plate 4 comprises four actuating motors 73, each one directly connected to one placement needle 40 so as to reveal four pairs of placement needle 40 plus actuating motor 73. Each actuating motor 73 is connected to a placement needle 40 at the first end 401 of the placement needle 40. Thus, these actuating motors 73 allow the second end 402 of the placement needles 40 to move translationally along the second axis ZZ' in order to move away from the body 22 of the pole 20 during the "final configuration" configuration as depicted in FIG. 6.

Thus, as previously mentioned, the automatic winding device 1 is able to move to the "initial configuration" depicted in FIG. 4, in which the four placement needles 40 apply a predetermined pressure to the body 22 of the pole 20. More specifically, this "initial configuration" begins with the positioning of each placement needle 40 against the body 22. In a variant, each placement needle 40 then moves away from the pole 20 by a distance less than or equal to 3 millimetres between the second end 402 and the body 22 to make it possible to obtain a clearance between each placement needle 40 and the pole 20. In addition, depending on the direction of winding as stated earlier, each placement needle 40 may, for preference, be in contact with the bottom 21 or with the head 23 of the pole 20. Thus, when winding is done from the bottom 21 towards the head 23 of the pole 20, then the "initial configuration" begins with the placing of the placement needles 40 against the body 22 and the bottom 21 of the pole 20. Conversely, if the winding is done from the head 23 towards the bottom 21 of the pole 20, then the "initial configuration" begins with the placing of the placement needles 40 against or, in a variant, in the proximity of the body 22 and of the head 23 of the pole 20. This positioning of the placement needles 40 proximate to the bottom 21 or to the head 23 of the pole 20 and proximate to the body 22 of the pole 20 is possible through activation of the first translational drive motor 71 driving the spline 7 to allow the spline 7 a translational movement with respect to the needle plate 4 and the actuating motors 73 that actuate the placement needles 40, causing the second end 402 of the placement needles 40 to effect a translational movement.

Once each placement needle 40 has been positioned, the automatic winding device 1 can move to the "winding configuration" depicted in FIG. 5, in which a rotation of the needle plate 4 equivalent to a full rotation of the pole 20 about the first axis XX' through actuation of the rotational-drive motor 70 driving the rotation of the needle plate 4, accompanied by the support carriage 3, and the translational movement of the pole 20 with respect to the needle plate 4 by a length equal to the diameter of the conducting wire 50 along the first axis XX' in the direction of winding occur in succession so as to wind the conducting wire 50 around the pole 20 through actuation of the first translational-drive motor 71 driving the needle plate 4. Before the rotational and translational movements occur, the feed arm 6 positions the conducting wire 50 in contact with at least one placement needle 40. Thus, because the conducting wire 50 is attached to the multi-pole rotor 2 by the first end of the conducting wire 501, this wire also undergoes the rotation about the first axis XX' through actuation of the rotation-driving motor 70 that drives the rotation of the needle plate 4. Specifically, the stiffness of the conducting wire 50 and the presence of the angle $\alpha$ that allows the conducting wire 50 to be inclined towards the body 22 is enough to allow the conducting wire 50 to slide.

Alternatively, the wire winder 5, which is connected to the conducting wire 50 at the second end 502 thereof, may comprise a wire restraining motor 5', restraining the conducting wire 50. This wire restraining motor 5' that restrains the conducting wire 50 makes it possible to generate continuous additional tension in the conducting wire 50. Thus, on each rotation of the support vice 3 and of the needle plate 4 that is equivalent to a full rotation of the pole 20 about the first axis XX', the conducting wire 50 wound around at least two placement needles 40 and forming a portion of a turn 51, slides along the placement needles 40 as a result of the tension and of the angle $\alpha$ as far as the second end 402 and is wound around the body 22 of the pole 20. There then follows the translational movement of the spline 7 with respect to the needle plate 4 by a length equivalent to the diameter of the conducting wire 50 along the first axis XX' in the direction of winding so as to obtain the space necessary, on the next rotation of the support vice 3 and of the needle plate 4 to accommodate a new turn 51.

Furthermore, the automatic winding device 1 may comprise a tension sensor sensing the tension in the conducting wire 50 and in contact with the conducting wire 50 at the level of the feed arm 6 and preferably fixed to the feed arm 6 so as to obtain a precise value for the tension in the winding wire 50 and adapt this tension. Further, each placement needle 40 may comprise a restraint indicator indicating the restraining of the conducting wire 50 to facilitate the guiding of the conducting wire 50 on the placement needle 40. This restraint indicator may simply be an indicator of the correct positioning of the feed arm 6 or even a restraining end stop allowing the feed arm 6 to be replaced.

Thus, the rotational and translational movements are repeated a predefined number of times until the predefined number of turns 51 is obtained around the body 22 of the pole 20. Having obtained the predefined number of turns 51 around the body 22 of the pole 20, the automatic winding device 1 can move to the "final configuration" depicted in FIG. 6. In this "final configuration", each placement needle 40 is distant from the pole 20 along the second axis ZZ' through the activation of the four actuating motors 73.

The automatic winding device 1 therefore performs a predetermined number of sequences from the "initial configuration" to the "winding configuration" and as far as the "final configuration". This predetermined number of sequences being connected with the number of layers of turns 51 desired for each pole 20.

The automatic winding device 1 offers the advantage of being able to perform winding with a graduation, as depicted in FIG. 6, in the number of layers of turns 51. Specifically, the automatic winding device 1 is also able to be configured to perform a predetermined number of rotations equivalent to a full rotation of the pole 20 about the first axis XX' and of translational movements by a length equal to the diameter of the conducting wire 50 along the first axis XX' during the "winding configuration". This predetermined number of rotational and of translational movements is equivalent to the number of turns 51 in the layer that can be wound around the body 22 and can be calculated according to the available space and the diameter of the conducting wire 50. Thus, a pole 20 may comprise a multitude of layers 510, 520 of turns 51 stacked on top of one another against the body 22 of the pole 20. The number of layers 510, 520 desired per pole therefore has an influence on the number of sequences through which the winding device 1 moves to the "initial configuration" and then to the "winding configuration" and finally to the "final configuration".

Furthermore, the graduated winding implies that the number of turns 51 per layer decreases. Thus, the layer 510 comprises a number of turns 51 that is predetermined according to the available space and the diameter of the conducting wire 50 and is greater than the number in the layer 520 because of the reduction in available space caused by the presence of the poles adjacent to the pole 20.

Figure 7:
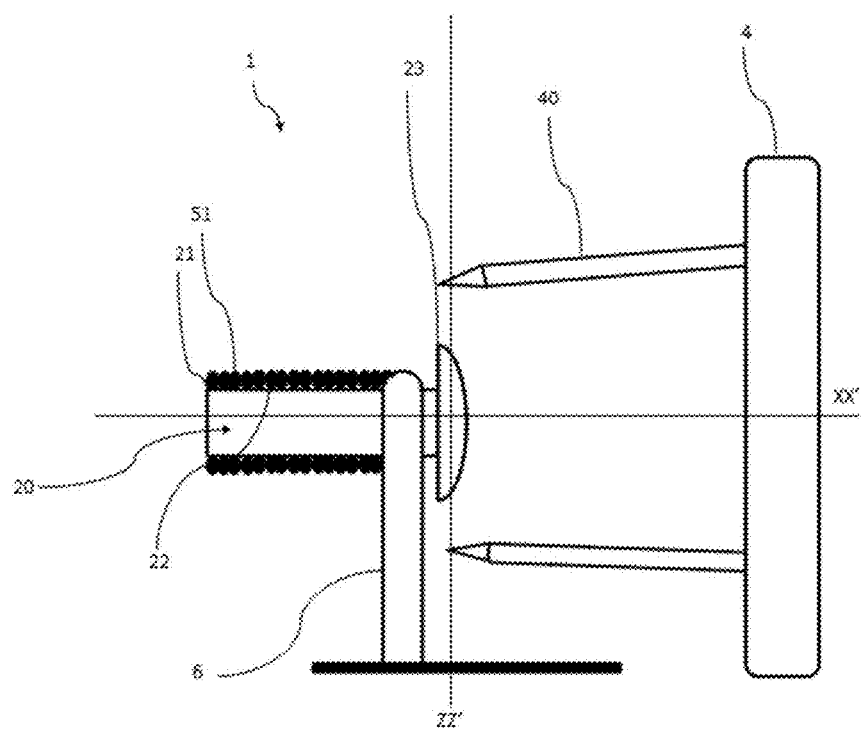
FIG. 7 depicts a schematic view of the needle plate and of the pole of the multi-pole rotor in a "hybrid configuration"

In addition to the "initial configuration", to the "winding configuration" and to the "final configuration", the automatic winding device 1 is able to move to a "hybrid configuration" following on from the "winding configuration" as depicted in FIG. 7. In this "hybrid configuration" and, in succession, the support vice 3 performs a rotation equivalent to a full rotation of the pole 20 about the first axis XX' and the wire feed arm 6 performs a translational movement along the first axis XX' in the direction of winding. More specifically, the "hybrid configuration" begins with a distancing of each placement needle 40 from the pole 20 of the multi-pole rotor 2 along the second axis ZZ' through activation of the actuating motors 73 that actuate the placement needles 40. The feed arm 6 then effects a translational movement along the first axis XX', through actuation of the second translational-drive motor 72, so as to face the body 22 and so as to place the conducting wire 50 directly against the body 22 without using the placement needles 40 to guide the wire, these needles becoming passive as in the "final configuration". There then follows, in a similar way to the "winding configuration", in succession, a rotation equivalent to a full rotation of the pole 20 about the first axis XX' of the support vice 3 and a translational movement of the wire feed arm 6 along the first axis XX' in the direction of winding by a length equal to the diameter of the conducting wire 50 so as to form turns 51. This translational movement of the feed arm 6 is performed in the direction of winding, which is to say that the feed arm 6 performs an identical translational movement to the translational movement observed in the preceding "winding configuration" by the pole 20 with respect to the needle plate 4. Thus, if the direction of winding observed during the preceding "winding configuration" is from the bottom 21 towards the head 23 of the pole 20, then each successive translational movement of the feed arm 6 takes place in the direction of the head 23 of the pole 20 along the first axis XX'. Conversely, if the direction of winding observed during the preceding "winding configuration" occurs from the head 23 of the pole towards the bottom 21, then each successive translational movement of the feed arm 6 in the "hybrid configuration" occurs in the direction of the bottom 21 of the pole 20 along the first axis XX'.

Specifically, close to the head 23 of the pole 20, the placement needles 40 are unable to provide optimized placement along the body 22 of the pole of the turns 51 formed during rotation of the needle plate 4. Thus, in order to guarantee uniform and optimized ordering of the turns 51 along the body 22 in a layer 510, the feed arm 6 takes over the function of guiding the turns 51 from the placement needles 40. This takeover is possible only near the head 23, where the space is least restricted. Conversely, such a takeover is not possible near the bottom 21 of the pole because of the tight spacing due to the presence of the adjacent poles. The automatic winding device 1 thus alternates, through use of the "winding configuration" and of the "hybrid configuration", between the means for guiding and winding the turns 51 around the body 22 of the pole 20.

Thus, the automatic winding device 1 performs the successive sequence of "initial configuration", "winding configuration", "hybrid configuration" and "final configuration" for a predetermined number of sequences equal to the number of layers of turns 51 desired around the body 22 of the pole 20.

Finally, the automatic winding device 1 may comprise a companion able to attach the conducting wire 50 to the multi-pole rotor 2 and to detach the conducting wire 50 from the multi-pole rotor 2.

The automatic winding device 1 is suitable for any type of rotor and preferably for rotors of the "internal rotor" type. The automatic winding device 1 is also suitable for rotors of the "external rotor" type for which winding needs to be performed from the centre of the rotor. As a result, the sizing of the automatic winding device 1 is adapted to suit the dimensions of the rotor so as to allow the winding of the poles of the rotor of the external rotor type.

Figure 8:
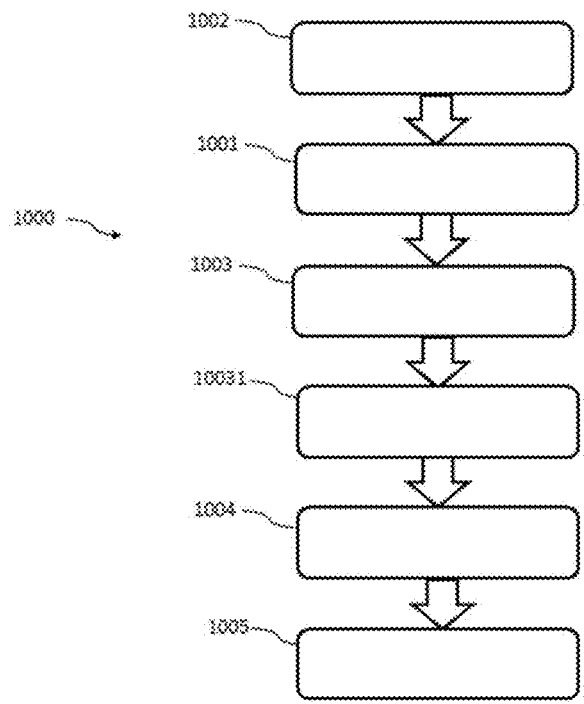
FIG. 8 depicts a schematic view of a method for automatically filling wire onto a pole of a multi-pole rotor according to the invention.

The invention also proposes a method (step 1000) for automatically filling a pole 20 of a multi-pole rotor 2 with wire, as depicted in FIG. 8. The automatic filling method (step 1000) comprises the following steps:

setting up the automatic winding device against the pole 20 of the multi-pole rotor 2, executing the "initial configuration" (step 1002), defined as being the placing of the four placement needles 40 in such a way as to be in contact with the pole 20 of the multi-pole rotor 2 or, in a variant, so as to be proximate to the pole 20, attaching (step 1001) the conducting wire 50 to the multi-pole rotor 2 by a first end of the conducting wire 501 using a companion, executing the "winding configuration" (step 1003), defined as being the succession of the rotation of the support vice 3 supporting the multi-pole rotor 2 and of the needle plate 4 about the first axis XX' equivalent to the full rotation of the pole 20 of the multi-pole rotor 2, the translational movement of the pole 20 with respect to the needle plate 4 by a length equal to the diameter of the conducting wire along the first axis XX' in the direction of winding. The "winding configuration" can be iterated in a predetermined manner, which is to say a predetermined number of times.

executing the "final configuration" (step 1004), defined as being the distancing of the four placement needles 40 from the pole 20 of the multi-pole rotor 2 along the second axis ZZ', detaching (step 1005) the conducting wire 50 from the multi-pole rotor 2 using the companion after step 1004.

Steps 1002, 1003 and 1004 can be executed a predetermined number of times.

The automatic filling method 1000 also comprises a step (step 10031) of executing the "hybrid configuration", defined as being the distancing of the four placement needles 40 from the pole 20 of the multi-pole rotor 2 along the second axis ZZ', the rotating of the support vice 3 supporting the multi-pole rotor 2 about the first axis XX' equivalent to the full rotation of the pole 20 of the multi-pole rotor 2, and the translational movement of the wire feed arm 6 along the first axis XX' in the direction of winding, it being possible for the rotating of the support vice 3 supporting the multi-pole rotor 2 and the translational movement of the wire feed arm 6 to be iterated in a predetermined way, following on from the step of executing the "winding configuration" (step 1003).

The invention claimed is:

1. An automatic winding device for winding wire onto a pole of a multi-pole rotor, the pole comprising a bottom and a head, the automatic winding device being characterized in that it comprises:
    a support vice supporting the multi-pole rotor and capable of rotational movement about a first axis passing through the pole of the multi-pole rotor,
    a needle plate, centred on the pole of the multi-pole rotor along the first axis, the needle plate comprising four placement needles, the needle plate being capable of translational and rotational movement about the first axis,
    a conducting wire attached to the multi-pole rotor at a first end of the conducting wire and to a wire winder at a second end of the conducting wire, the conducting wire being in contact with at least one placement needle,
    the automatic winding device being able to perform a predetermined number of sequences from an initial configuration wherein each placement needle applies a predetermined pressure to the pole at a predetermined angle with respect to the first axis to a winding configuration wherein a rotation of the needle plate equivalent to a full rotation of the pole about the first axis and a translational movement of the pole with respect to the needle plate by a length equal to a diameter of the conducting wire along the first axis occur in succession so as to wind the conducting wire around the pole, as far as a final configuration wherein each placement needle is distant from the pole along a second axis that is radial to the needle plate.

2. The automatic winding device according to claim 1, wherein each placement needle is proximate to the pole at a distance less than or equal to 0.3 millimetres during the initial configuration.

3. The automatic winding device according to claim 1, wherein each placement needle is against the pole in the initial configuration.

4. The automatic winding device according to claim 1, wherein each placement needle comprises an end of a shape that complements the pole of the multi-pole rotor.

5. The automatic winding device according to claim 1, comprising a wire feed arm, the feed arm being capable of translational movement along the first axis.

6. The automatic winding device according to claim 1, the automatic winding device being able to move to a hybrid configuration after the winding configuration, wherein, in succession, the support vice performs a rotation equivalent to a full rotation of the pole about the first axis and a wire feed arm performs a translational movement along the first axis, each placement needle being distant from the pole of the multi-pole rotor along the second axis.

7. The automatic winding device according to claim 1, wherein each placement needle is connected to an indicator for detecting an insulation fault with the conducting wire.

8. The automatic winding device according to claim 1, comprising a wire tension sensor, the tension sensor being in contact with the conducting wire.

9. The automatic winding device according to claim 1, comprising a companion able to attach the conducting wire to the multi-pole rotor and to detach the conducting wire from the multi-pole rotor.

10. The automatic winding device according to claim 1, wherein the support vice supporting the multi-pole rotor is a self-centring clamping vice.

11. The automatic winding method for winding wire onto a pole of a multi-pole rotor, comprising the following steps:
    setting up the automatic winding device according to claim 1,
    executing the initial configuration, defined as being the placing of the four placement needles in such a way as to apply pressure to the pole of the multi-pole rotor,
    attaching the conducting wire to the multi-pole rotor by the first end of the conducting wire using a companion,
    executing the winding configuration, defined as being the succession of the rotation of the support vice supporting the multi-pole rotor and of the needle plate about the first axis equivalent to the full rotation of the pole of the multi-pole rotor, the translational movement of the pole with respect to the needle plate by a length equal to the diameter of the conducting wire along the first axis, it being possible for the winding configuration to be iterated in a predetermined manner,
    executing the final configuration, defined as being the distancing of the four placement needles from the pole of the multi-pole rotor along the second axis,
    the steps of executing the initial configuration, of executing the winding configuration and of executing the final configuration being able to be executed a predetermined number of times.

12. The automatic winding method according to claim 11, the method comprising a step of executing the hybrid configuration, defined as being the distancing of the four placement needles from the pole of the multi-pole rotor along the second axis, the rotating of the support vice supporting the multi-pole rotor about the first axis equivalent to a full rotation of the pole of the multi-pole rotor, and the translational movement of the wire feed arm along the first axis, it being possible for the rotating of the support vice supporting the multi-pole rotor and the translational movement of the wire feed arm to be iterated in a predetermined way, following on from the step of executing the winding configuration.

13. The automatic winding method according to claim 11, the method comprising a detaching step whereby the companion detaches the conducting wire from the multi-pole rotor, following on from the step of executing the final configuration.

* * * * *